United States Patent
Kamiya et al.

(10) Patent No.: US 7,432,680 B2
(45) Date of Patent: Oct. 7, 2008

(54) CIRCUIT AND METHOD FOR CONTROLLING MOTOR

(75) Inventors: Tomonori Kamiya, Ichinomiya (JP); Takeshi Kura, Ogaki (JP); Yukihiko Shigeoka, Ogaki (JP); Naohiro Nishiwaki, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 327 days.

(21) Appl. No.: 11/367,766

(22) Filed: Mar. 3, 2006

(65) Prior Publication Data
US 2006/0197488 A1     Sep. 7, 2006

(30) Foreign Application Priority Data
Mar. 4, 2005    (JP)    ............................ 2005-060580

(51) Int. Cl.
*G05B 11/01*    (2006.01)

(52) U.S. Cl. ...................... 318/560; 318/685; 318/696; 369/47.1; 369/44.28

(58) Field of Classification Search .................. 318/560, 318/685, 696, 432; 369/47.1, 44.28
See application file for complete search history.

(56) References Cited

U.S. PATENT DOCUMENTS

| | | | | |
|---|---|---|---|---|
| 6,122,234 A * | 9/2000 | Fujitani et al. | ............. | 369/47.4 |
| 6,555,985 B1 * | 4/2003 | Kawabata et al. | ........... | 318/685 |
| 6,577,094 B2 * | 6/2003 | Ohtsu et al. | ................. | 318/696 |

* cited by examiner

*Primary Examiner*—Rina I Duda
(74) *Attorney, Agent, or Firm*—Occhiuti Rohlicek & Tsao LLP

(57) ABSTRACT

A motor control circuit for reducing current consumption. A stepping motor control circuit includes an A/B phase current setting signal generation circuit for generating an A/B phase current signal setting signals provided to a stepping motor driver to supply a stepping motor with a predetermined amount of drive current. Based on a switch signal, first and second switches selectively output an A/B phase current setting signal and an A/B phase reference signal, for reducing the drive current of the stepping motor more than the A/B phase current setting signal. An intermittent drive control circuit generates the switch signal. The stepping motor control circuit provides the motor driver with the A/B phase reference signal in accordance with the switch signal.

12 Claims, 5 Drawing Sheets

CIRCUIT AND METHOD FOR CONTROLLING MOTOR

CROSS-REFERENCE TO RELATED APPLICATIONS

This application is based upon and claims the benefit of priority from the prior Japanese Patent Application No. 2005-060580, filed on Mar. 4, 2005, the entire contents of which are incorporated herein by reference.

BACKGROUND OF THE INVENTION

The present invention relates to a circuit and method for controlling motors, and more particularly, to a circuit and a method for controlling a motor for moving an optical pickup of an optical disc device.

An optical disc device includes a control circuit for writing data onto an optical disc or reading data from the optical disc by irradiating a laser beam onto the optical disc from the optical pickup. The control circuit includes a motor control circuit for controlling a stepping motor for moving the optical pickup.

The motor control circuit provides, for example, the stepping motor with a plurality of drive signals having different phases (e.g., A phase and B phase). The stepping motor is driven based on the voltage of each drive signal and the phase difference between the drive signals. The stepping motor drives and moves the optical pickup along the radial direction of the optical disc.

There is a demand for power consumption reduction in optical disc devices or portable equipment incorporating an optical disc device. Further, in the same manner, there is a demand for power consumption reduction in motor control circuits for optical disc devices.

SUMMARY OF THE INVENTION

The present invention provides a motor control circuit and motor control method for reducing current consumption.

One aspect of the present invention is a circuit for controlling a motor for moving an optical pickup unit along a radial direction of an optical disc. The optical pickup unit records data to the optical disc and/or reproduces the data recorded on the optical disc. The circuit includes a motor control unit for selectively supplying the motor with a first drive current, for driving the motor, and a second drive current, having a current amount reduced from the first drive current.

Another aspect of the present invention is a method for controlling a motor in a tracking servo mode, including a plurality of requested operations, to move an optical pickup unit along a radial direction of an optical disc. The optical pickup unit is used to record data to the optical disc and/or reproduce the data recorded on the optical disc. The motor is driven by a motor driver. The method includes generating a current setting signal for driving the motor, and setting a ratio of an ON period, during which the motor is supplied with a predetermined amount of current, to an OFF period, during which the motor is supplied with an amount of current reduced from the predetermined amount. The method further includes selectively providing the motor driver with the current setting signal and a current reducing signal for reducing current for driving the motor based on the set ratio, and varying the ratio of the ON period and the OFF period in accordance with a selected one of the requested operations during the tracking servo mode.

A further aspect of the present invention is a method for controlling a motor for moving an optical pickup unit along a radial direction of an optical disc. The optical pickup unit is used to record data to the optical disc and/or reproduce the data recorded on the optical disc. The motor is driven by a motor driver. The method includes generating a current setting signal for driving the motor, and setting a ratio of an ON period, during which the motor is supplied with a predetermined amount of current, to an OFF period, during which the motor is supplied with an amount of current reduced from the predetermined amount. The method further includes selectively providing the motor driver with the current setting signal and a current reducing signal for reducing current for driving the motor based on the set ratio.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
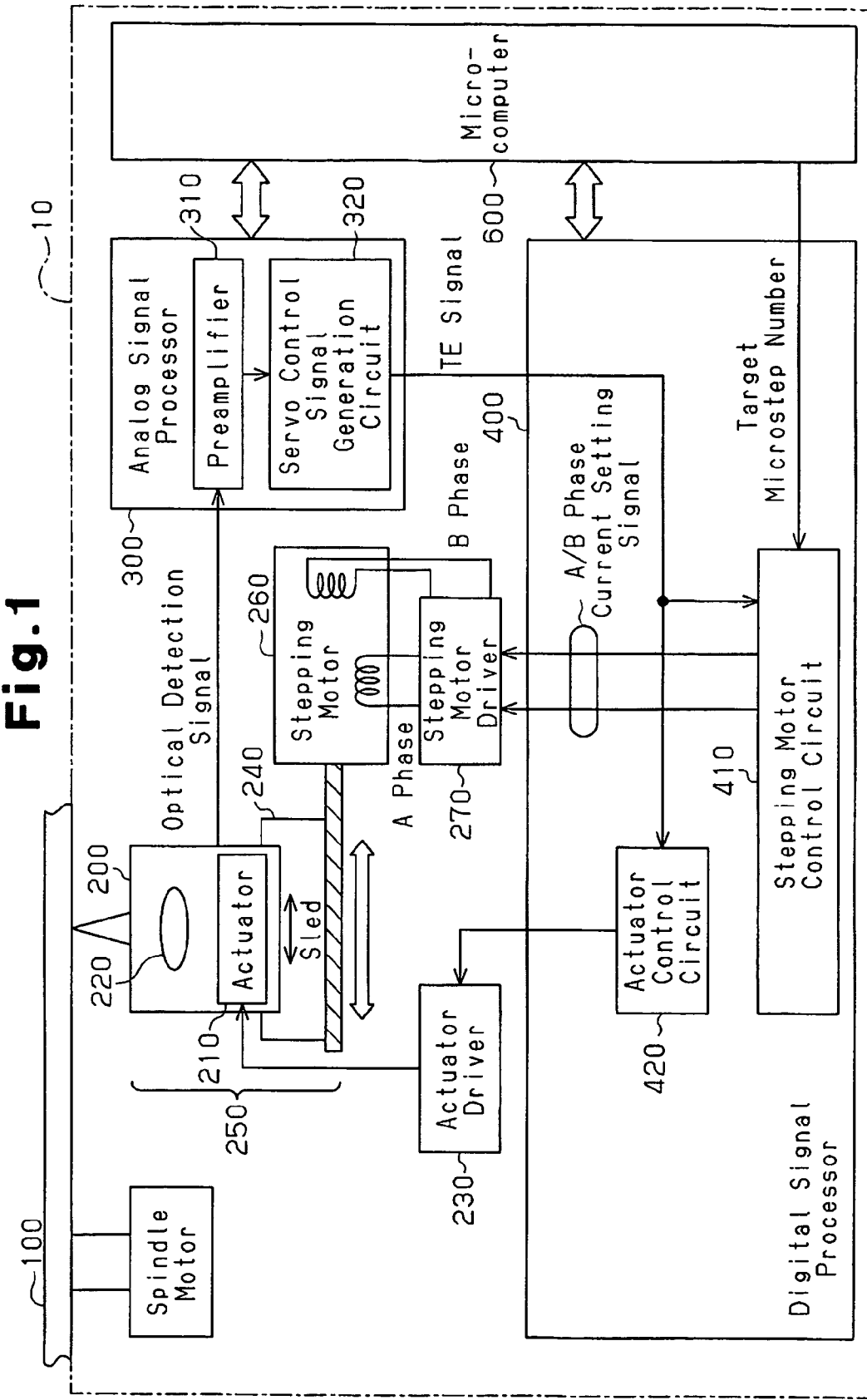
FIG. 1 is a schematic block diagram of an optical disc device according to a preferred embodiment of the present invention.

In the drawings, like numerals are used for like elements throughout.

An optical disc device 10 according to a preferred embodiment of the present invention will now be described with reference to the drawings.

FIG. 1 is a schematic block diagram of the optical disc device 10. An optical pickup 200 is a device for recording data onto an optical disc 100 and reproducing the data recorded on the optical disc 100 using an optical system including a light source, a lens, an optical detector, and the like. The optical pickup 200 incorporates an actuator 210 for tracking servo, focus servo, and tilt control purposes.

The optical pickup 200 is movably attached to a sled 240. The sled 240 supports the optical pickup 200 so that the optical pickup 200 faces the disc surface of the optical disc 100. Further, the sled 240 moves the optical pickup 200 along the radial direction of the optical disc 100. An optical pickup unit 250 includes the sled 240 and the optical pickup 200.

The optical pickup unit 250 is capable of performing a short jump and a long jump in addition to movement resulting from normal tracking servo operations.

The short jump will now be described. In a normal tracking servo operation, only the optical pickup 200 moves on the sled 240 in a state in which the position of the sled 240 is fixed. When the optical pickup 200 approaches a position located near the limit of the movable range of the sled 240, the sled 240 moves and returns the optical pickup 200 to a central position of the sled 240. As a result, the optical pickup 200 is set again to a movable position on the sled 240. In this manner, a short jump operation is controlled in a manner similar to the normal tracking servo operation.

The long jump will now be described. In a long jump, the movement distance of the optical pickup 200 is set to be longer than the movable range on the sled 240. The sled 240 moves with the optical pickup 200 in accordance with the set distance.

Generally, a stepping motor 260 is used as a driving source for moving the optical pickup unit 250. As known in the art, the stepping motor 260 generates rotation in predetermined step angles in accordance with a predetermined input pulses. The stepping motor 260 is driven by the stepping motor driver 270.

The stepping motor 260, which uses two phases, may employ drive techniques, such as a one-phase excitation drive, two-phase excitation drive, one-two phase excitation drive, or microstep drive technique. In the present invention, the two-phase stepping motor 260 uses an A phase motor drive coil and a B phase motor drive coil to reduce the number of switching elements of the stepping motor driver 270. Further, the microstep drive technique is employed in the present invention to enhance the resolution of the step number and to perform positional control with high accuracy. The present invention is not necessarily limited to a two-phase stepping motor 260. Further, the present invention may use any of the driving methods of the stepping motor 260 described above.

Figure 2:
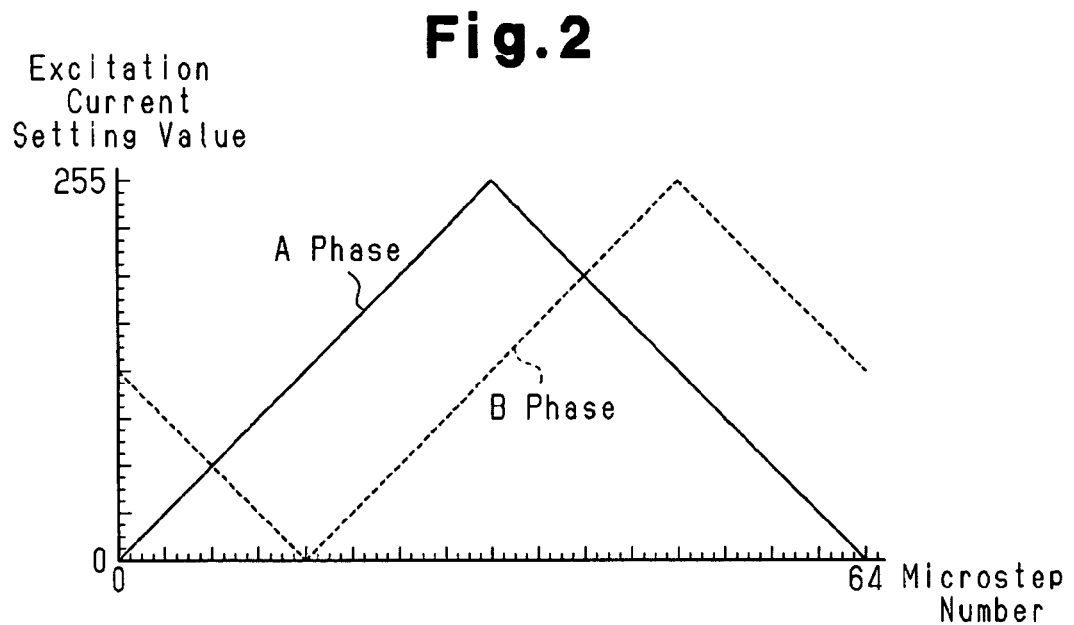
FIG. 2 is a waveform chart schematically showing an A/B phase current setting signal for controlling a stepping motor shown in FIG. 1.

FIG. 2 shows a waveform chart of an A phase current setting signal and a B phase current setting signal that are in correspondence with the microstep drive technique employed to control the stepping motor 260 of FIG. 1. The lateral axis shown in FIG. 2 represents the microstep number obtained by dividing one step, which is equivalent to a reference step angle of the stepping motor 260, by N (natural number, e.g., "64"). That is, the stepping motor 260 is rotated by "reference step angle/64" per microstep. The vertical axis shown in FIG. 2 represents the quantization level obtained by dividing the setting range of the excitation current flowing through each of the A phase and B phase motor drive coils by M (natural number, e.g., "256").

As shown in FIG. 2, the A phase current setting signal and the B phase current setting signal are triangular wave signals for respectively setting the excitation current corresponding to the microstep number for the A phase motor drive coil and the B phase motor drive coil of the stepping motor 260. The phase of the A phase current setting signal and the phase of the B phase current setting signal are shifted by 90° with respect to each other. In the microstep drive technique, the ratio between the excitation current of the A phase motor driving coil and the excitation current of the B phase motor driving coil is set according to the target microstep number by the A phase current setting signal and the B phase current setting signal. That is, the stepping motor 260 is rotated at a rotation angle corresponding to the target microstep number according to the ratio of the excitation current of the A phase motor driving coil and the excitation current of the B phase motor driving coil.

In the present invention, a sinusoidal wave signal may be used as the A/B phase current setting signal. However, a triangular wave signal is preferable as the A/B phase current setting signal since the triangular wave signal may easily be generated with a simple configuration.

Figure 3:
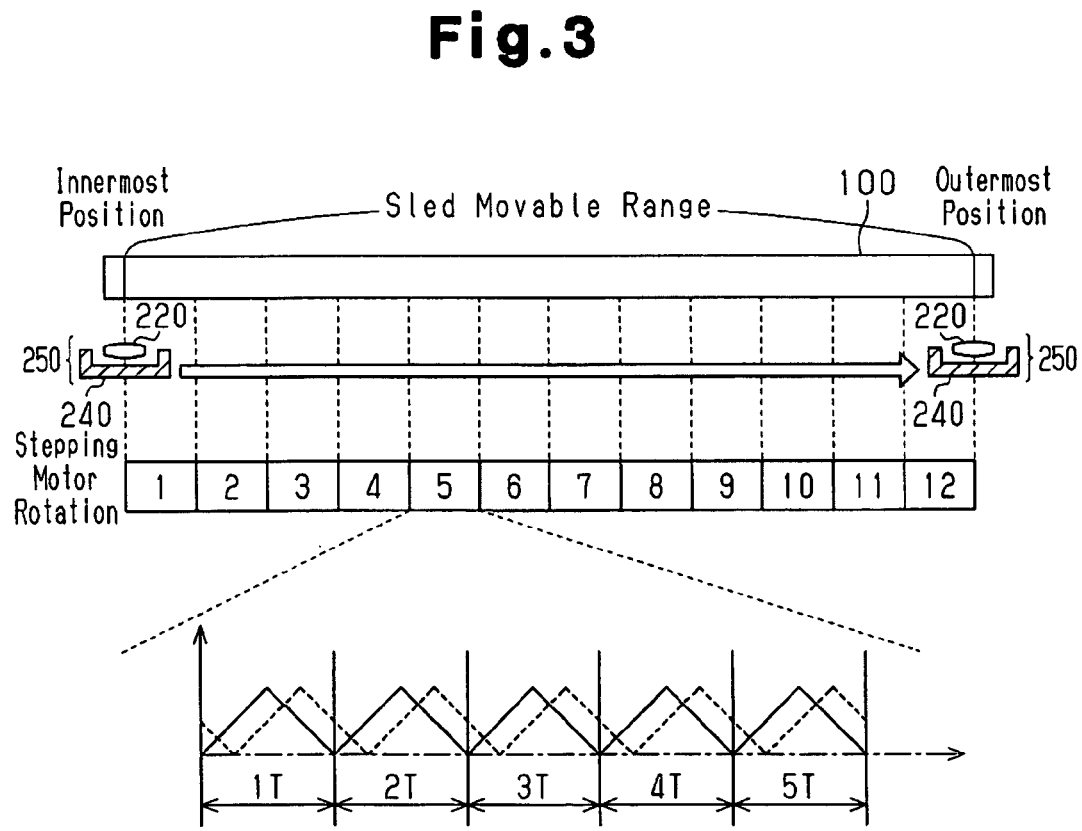
FIG. 3 is a schematic diagram showing the relationship between the pulse cycle of the A/B phase current setting signal of FIG. 2, the number of rotations generated by the stepping motor shown in FIG. 1, and the movement amount of the optical pickup unit shown in FIG. 1.

FIG. 3 is a schematic diagram showing the movement amount of the optical pickup unit 250 when the reference step angle of the stepping motor 260 is set to 72° and the stepping motor 260 generates a single rotation with five cycles of the A/B phase current setting signal. In the preferred embodiment, the sled 240 of the optical pickup unit 250 moves from the innermost position to the outermost position of the optical disc 100 when the stepping motor 260 generates approximately 12 rotations. In this case, the A/B phase current setting signal is necessary for sixty cycles (12 rotations×5 cycles).

In this manner, the stepping motor 260 generates rotation for a rotation angle corresponding to the number of cycles of the A/B phase current setting signal, which has cyclicality. Further, the optical pickup unit 250 moves in correspondence with the rotation angle of the stepping motor 260.

An analog signal processor 300 shown in FIG. 1 performs optical disc control analog signal processing. The analog signal processor 300 includes a preamplifier 310, for amplifying an optical detection signal extracted from the optical disc 100 by the optical pickup 200, and a servo control signal generation circuit 320, for generating a tracking error signal (hereinafter referred to as a TE signal) for tracking servo purposes from the amplified signal generated in the preamplifier 310. During tracking servo, based on the optical detection signal, the analog signal processor 300 generates the TE signal (i.e., traverse signal) for detecting the number of recording tracks the laser beam traverses, that is, the movement amount of the optical pickup 200 on the sled 240.

A digital signal processor 400 performs optical disc control digital signal processing such as digital servo processing or encoding and decoding.

The stepping motor control circuit 410 controls and drives the stepping motor 260 through the stepping motor driver 270. The movement amount of the optical pickup unit 250 from the current position to a target position is set by the TE signal provided from the analog signal processor 300 for a short jump and set by a target microstep number specified by the microcomputer 600 for a long jump. The control circuit 410 generates the A/B phase current setting signal to generate rotation with the stepping motor 260 for a rotation angle corresponding to the movement amount. The control circuit 410 determines the number of pulse cycles of the triangular wave signal used as a reference for generating the A/B phase current setting signal in parallel with the generation of the A/B phase current setting signal.

The actuator control circuit 420 calculates a command value for controlling the actuator 210 to move an objective lens 220 of the optical pickup 200 based on the TE signal from the servo control signal generation circuit 320. Then, the actuator control circuit 420 provides the command value to the actuator driver 230. The actuator driver 230 drives the actuator 210 based on the command value.

The microcomputer 600 controls the entire optical disc device 10. The microcomputer 600 controls analog processing in the analog signal processor 300, digital processing in the digital signal processor 400, and the like in a centralized manner.

The configuration and the operation of the stepping motor control circuit 410 serving as a control circuit of the optical disc device 10 will now be described.

Figure 4:
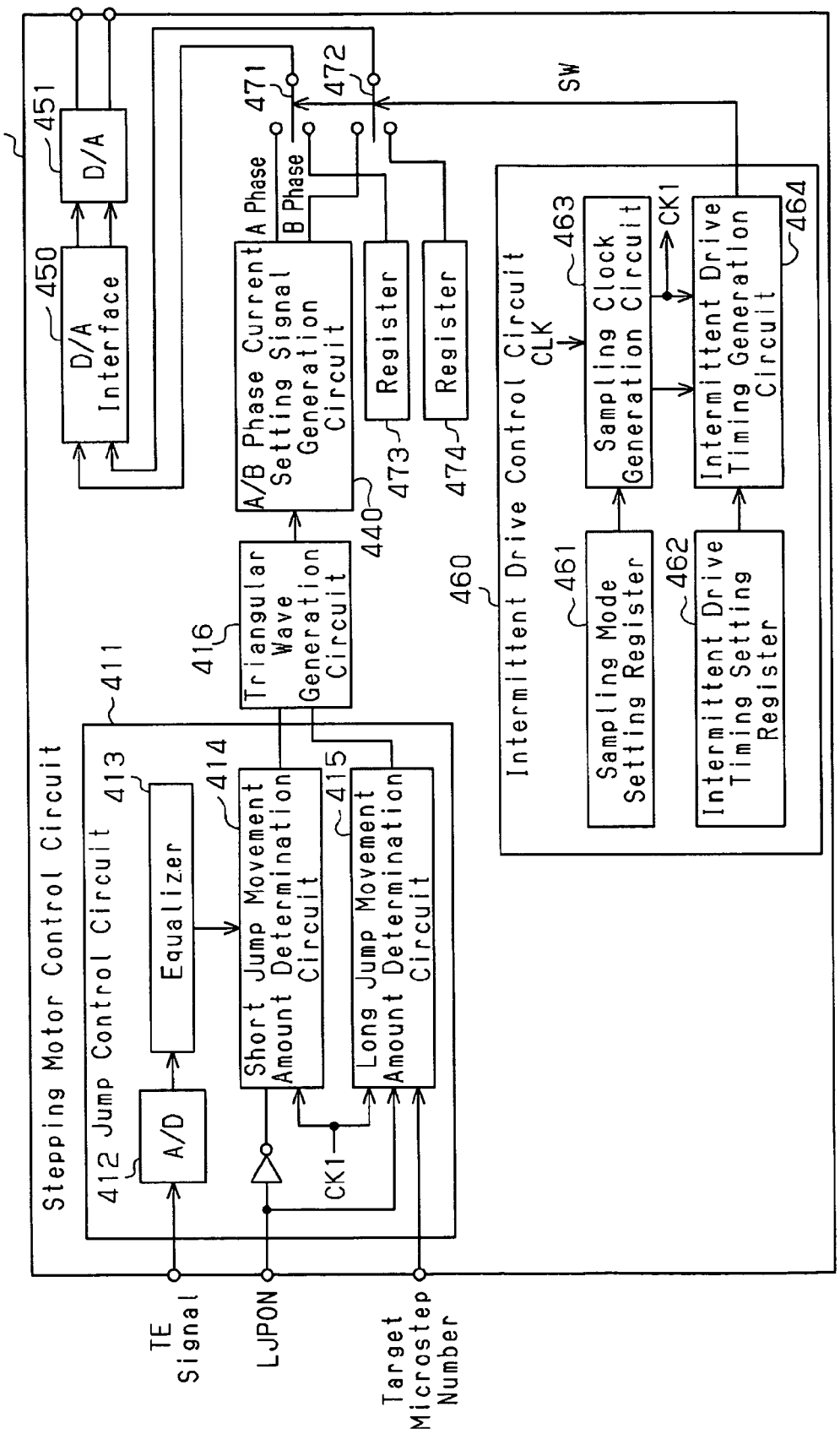
FIG. 4 is a schematic block diagram of the stepping motor control circuit shown in FIG. 1.

FIG. 4 is a block diagram schematically showing the stepping motor control circuit 410.

The stepping motor control circuit 410 includes a jump control circuit 411, an A/B phase current setting signal generation circuit 440, and an intermittent drive control circuit 460.

The jump control circuit 411 controls and sets the movement amount of the optical pickup unit 250 for a short jump and a long jump. An LJPON signal, which is shown in FIG. 4, is a signal for selecting either a short jump mode or a long jump mode. The LJPON signal is either provided from the microcomputer 600 or generated in the stepping motor control circuit 410. For instance, if the LJPON signal is set to "0", a short jump movement amount determination circuit 414 is activated to execute control for normal tracking servo or short jump. Further, if the LJPON signal is set to "1", a long jump movement amount determination circuit 415 is activated to execute control for a long jump.

The short jump mode will now be described. The jump control circuit 411 includes an A/D converter 412 and an equalizer 413. The A/D converter 412 converts the TE signal provided from the analog signal processor 300 to a digital signal. The equalizer 413 then detects the pass components of the TE signal with a low pass filter (not shown) based on the digital signal provided from the A/D converter 412.

The short jump movement amount determination circuit 414 determines whether or not the movement amount of the optical pickup 200 on the sled 240 is within the movable range based on the low pass components of the TE signal. If the movement amount exceeds the movable range, the determination circuit 414 sets the movement amount of the sled 240 to return the optical pickup 200 to a predetermined reference position of the sled 240 (e.g., central position on the sled 240). Then, the determination circuit 414 provides the triangular wave generation circuit 416 with a signal indicating the set movement amount. The determination circuit 414 thus executes control for returning the optical pickup 200 to a predetermined reference position on the sled 240 when the optical pickup 200 reaches a position at the end of the sled 240 during normal tracking servo.

Next, the long jump mode will be described. The long jump movement amount determination circuit 415 sets the movement amount for moving the optical pickup unit 250 from the current position to the target position based on the target microstep number specified by the microcomputer 600. Then, the determination circuit 415 provides the triangular wave generation circuit 416 with a signal indicating the movement amount.

The triangular wave generation circuit 416 generates a triangular wave signal used as a reference for the A/B current setting signal through a count up/down operation. The microstep number of the A/B phase current setting signal corresponds to the counter cycle number of a count ups or count downs performed by the triangular wave generation circuit 416. Further, an excitation current setting value of the A/B phase current setting signal corresponds to the count value of the count up or count down performed by the triangular wave generation circuit 416. For instance, a count up is performed when the optical pickup unit 250 is moved outwards, and a count down is performed when the optical pickup unit 250 in moved inwards.

The triangular wave generation circuit 416 counts up or counts down the count value of the triangular wave signal in a count range obtained by multiplying the quantization number (e.g., "256") of the excitation current setting value by two times. The triangular wave generation circuit 416 then matches the phase of the triangular wave signal to the phase of either one of the A phase current setting signal and the B phase current setting signal. The triangular wave generation circuit 416 further resets the count value whenever reaching a counter cycle number (e.g., "64") equivalent to one cycle of either one of the current setting signals. In this manner, the triangular wave generation circuit 416 generates the triangular wave signal with cyclicality.

The A/B phase current setting generation circuit 440 generates the A phase current setting signal and the B phase current setting signal based on the triangular wave signal provided from the triangular wave generation circuit 416. Specifically, the A/B phase current setting signal generation circuit 440 generates a triangular A phase current setting signal when the count value of the triangular wave signal reaches the maximum quantization number (e.g., "255") of the excitation current setting value by decreasing the count value. Further, the A/B phase current setting signal generation circuit 440 generates the B phase current setting signal by shifting the phase of the A phase current setting signal by 90°. Each of the generated A/B phase current setting signals is provided to a D/A interface 450. The D/A interface 450 sequentially transfers each A/B phase current setting signal to the D/A converter 451 by executing time-sharing control. The D/A converter 451 converts each A/B phase current setting signal to an analog signal. Each current setting signal converted to an analog signal is provided to the stepping motor driver 270.

A first switch 471 and a second switch 472 controlled by the intermittent drive control circuit 460 is connected between the A/B phase current setting signal generation circuit 440 and the D/A interface 450. The first and second switches 471 and 472 each function as a switch circuit. The first switch 471 includes a first terminal connected to the A/B phase current setting signal generation circuit 440, a second terminal connected to a first setting register 473, and a common terminal connected to the D/A interface 450. The A phase current setting signal is provided to the first terminal of the first switch 471, and the A phase reference signal, which serves as a current reducing signal indicating the value stored in the first setting register 473, is provided to the second terminal of the first switch 471. The second switch 472 includes a first terminal connected to the A/B phase current setting signal generation circuit 440, a second terminal connected to a second setting register 474, and a common terminal connected to the D/A interface 450. The B phase current setting signal is provided to the first terminal of the second switch 472, and the B phase reference signal, which serves as a current reducing signal indicating the value stored in the second setting register 474, is provided to the second terminal of the second switch 472.

The intermittent drive control circuit 460 selectively connects the common terminal of the first switch 471 to the first and the second terminals of the first switch 471. Further, the intermittent drive control circuit 460 selectively connects the common terminal of the second switch 472 to the first and the second terminals of the second switch 472. Therefore, the D/A converter 45 is intermittently provided with the A phase reference signal and with the B phase reference signal.

The values of the A/B phase reference signals are set to values that prevent current from flowing to the stepping motor 260. These values are set in accordance with the configuration of the D/A converter 451, the stepping motor 260, and the stepping motor driver 270. The A/B phase reference signals are signals represented by digital values. Therefore, the first and second switches 471 and 472 are configured more simply than a switch for switching analog signals. Further, the switching control of the first and second switches 471 and 472 is easily executed. The values of the A/B phase reference signals are also easily set.

The stepping motor driver 270 shown in FIG. 1 supplies the excitation current corresponding to the ratio set according to the target microstep number to the A phase motor drive coil and the B phase motor drive coil of the stepping motor 260 based on the A phase current setting signal and the 8 phase current setting signal. Further, the reference voltage Vref is supplied to the stepping motor driver 270. The stepping motor driver 270 changes the direction of the current supplied to the A phase motor drive coil in accordance with the difference between the reference voltage Vref and the voltage of the A phase current setting signal. The stepping motor driver 270 further changes the direction of the current supplied to the B phase motor drive coil in accordance with the difference between the reference voltage Vref and the voltage of the B phase current setting signal. The reference voltage Vref is set to, for example, a median voltage ((maximum voltage+minimum voltage)/2) of the A/B phase current setting signals.

Figure 5:
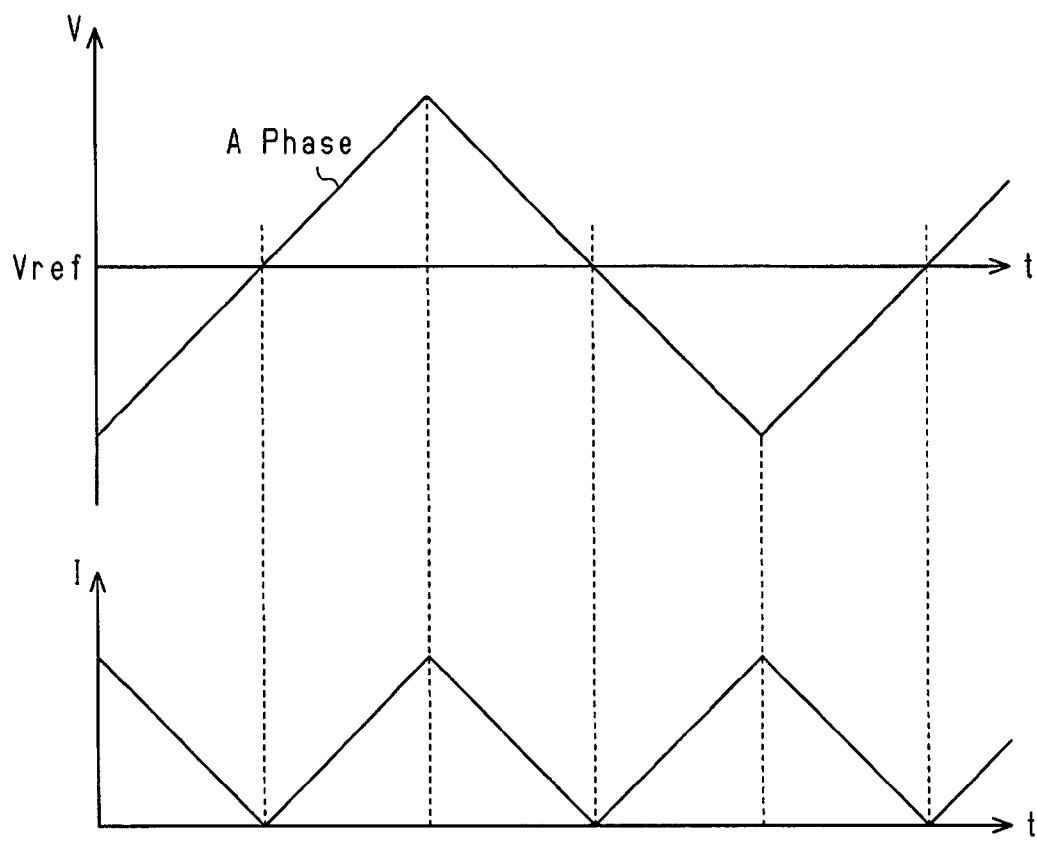
FIG. 5 is a waveform chart schematically showing the relationship between the voltage of the A phase current setting signal provided to the stepping motor shown in FIG. 1 and the current consumption of the stepping motor.

The driver 270, for example, provides the first terminal of the A phase motor drive coil with the first voltage difference (or voltage multiplied by a coefficient) indicating the difference between the voltage of the A phase current setting signal and the reference voltage Vref and provides the second terminal of the A phase motor drive coil with the inverted voltage of the first voltage difference of which reference is the reference voltage Vref. When the voltage of the A phase current setting signal is higher than the reference voltage Vref, current corresponding to the voltage difference flows from the first terminal towards the second terminal of the A phase motor drive coil. When the voltage of the A phase current setting signal is lower than the reference voltage Vref, current corresponding to the voltage difference flows from the second terminal towards the first terminal of the A phase motor drive coil. Therefore, when the voltage of the A phase current setting signal matches the reference voltage Vref, that is, when the voltage difference is zero, current does not flow to the A phase motor drive coil. Similarly, when the voltage of the B phase current setting signal differs from the reference voltage Vref, current corresponding to the voltage difference flows to the B phase motor drive coil. Further, when the voltage of the B phase current setting signal matches the reference voltage Vref, current does not flow to the B phase motor drive coil. That is, current flowing to the A phase motor drive coil increases as the difference between the voltage of the A phase current setting signal and the reference voltage Vref increases, as shown in FIG. 5. On the other hand, current flowing to the A phase motor drive coil decrease as the voltage difference decreases. This is the same for the B phase.

The stepping motor control circuit 410 stops supplying current to the A/B phase motor drive coils by providing the motor driver 270 with the A/B phase current setting signals indicating voltage that is substantially the same as the reference voltage Vref. A value indicating voltage that is substantially the same as the reference voltage Vref is thus set for the first and second setting registers 473 and 474 shown in FIG. 4. When the common terminal of the first switch 471 is connected to the second terminal of the first switch 471, the A phase reference signal indicating the value corresponding to the reference voltage Vref is provided from the first setting register 473 to the common terminal. When the common terminal of the second switch 472 is connected to the second terminal of the second switch 472, the B phase reference signal indicating the value corresponding to the reference voltage Vref is provided from the second setting register 474 to the common terminal.

In this manner, the intermittent drive control circuit 460 intermittently provides the stepping motor driver 270 with the A phase reference signal and the B phase reference signal. Consequently, the stepping motor driver 270 intermittently stops supplying the stepping motor 260 with the drive current. The current consumption is thus reduced compared to a configuration in which drive current is constantly supplied to the stepping motor 260.

The configuration of the intermittent drive control circuit 460 will now be described.

The intermittent drive control circuit 460 includes a sampling mode setting register (hereinafter referred to as mode register) 461, an intermittent drive timing setting register (hereinafter referred to as timing register) 462, a sampling clock generation circuit (hereinafter referred to as clock generation circuit) 463, and an intermittent drive timing generation circuit (hereinafter referred to as timing generation circuit) 464.

A setting value of the clock signal generated by the clock generation circuit 463 is stored in the mode register 461. The clock generation circuit 463 generates the clock signal CK1 used in the stepping motor control circuit 410 from the reference clock signal CLK. The clock generation circuit 463 further generates the clock signal CK1 by frequency-dividing the reference clock signal CLK in accordance with the setting value of the mode register 461. The clock generation circuit 463 uses, for example, the operation clock of the microcomputer 600 (refer to FIG. 1) as the reference clock signal CLK. The generated clock signal CK1 is provided to the timing generation circuit 464, the short jump movement amount determination circuit 414, and the long jump movement amount determination circuit 415.

A setting value indicating the ratio between the time (ON period) in which current is supplied to the stepping motor 260 and the time (OFF period) in which current is not supplied to the stepping motor 260 during a reference period is stored in the timing register 462. The timing generation circuit 464 generates a pulse-shaped switching signal SW in which the ratio between the period of an H level and the period of an L level is set in accordance with the setting value.

One example will now be described. The clock generation circuit 463 generates the clock signal CK1 by frequency-dividing the reference clock signal CLK by eight. The timing generation circuit 464 counts the pulse of the clock signal CK1 provided from the clock generation circuit 463 and generates the switching signal SW in accordance with the count value. If the reference period is set to "8", the values of "0" to "7" are stored in the timing register 462 as the setting values.

When the setting value of the timing register 462 is "0", the timing generation circuit 464 always sets the switching signal SW to H level. Therefore, the first and second switches 471 and 472 do not perform the switching operation. Thus, the stepping motor 260 does not perform intermittent operation. That is, the setting value of "0" is set to disable intermittent operation of the stepping motor 260.

Figure 6:
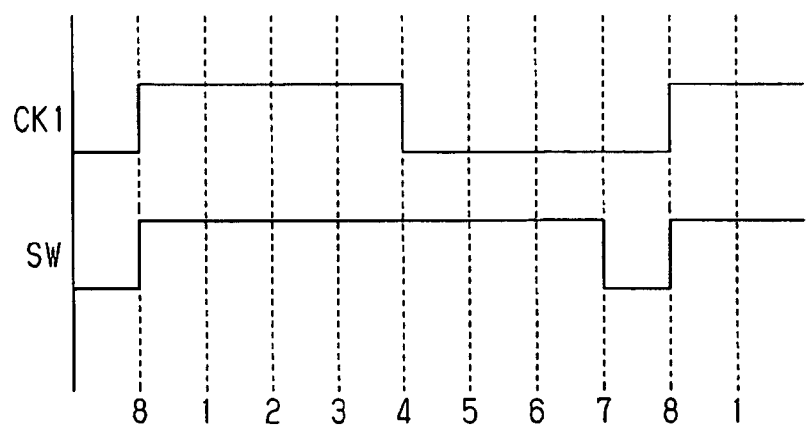
FIG. 6 is a waveform chart of a switching signal for intermittently driving the stepping motor of FIG. 1.

When the setting value of the timing register 462 is "1" to "7", the timing generation circuit 464 accordingly sets the ratio of the period in which the switching signal SW is set to an H level and the period in which the switching signal SW is set to an L level to "1:7" to "7:1". FIG. 6 is a waveform chart of the switching signal SW when the setting value of the timing register 462 is "7". The timing generation circuit 464 counts the clock signal CK1 and resets the count value when the count value becomes equal to a value corresponding to the reference period. The timing generation circuit 464 then generates the switching signal SW having an H level from when the count value is reset until the count value becomes 7. The timing generation circuit 464 further generates the switching signal SW having an L level from when the count value is 7 until it becomes 8.

The first and second switches 471 and 472 connect the common terminal to the first terminal or the second terminal in response to the level of the switching signal SW. The first and second switches 471 and 472 connect the common terminal to the first terminal in response to the switching signal SW of an H level and connect the common terminal to the second terminal in response to the switching signal SW of an L level.

Figure 7:
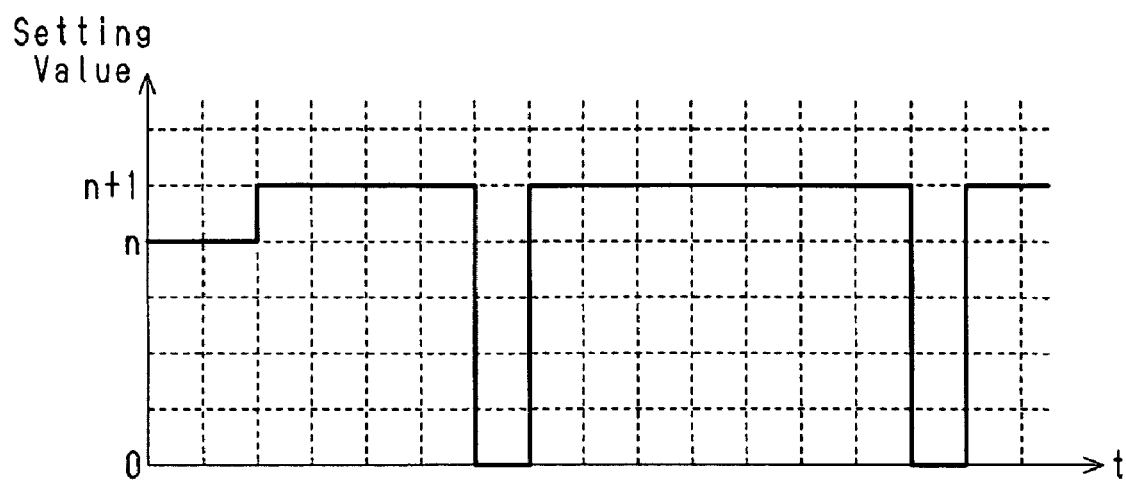
FIG. 7 is a waveform chart showing the intermittent drive of the stepping motor shown in FIG. 1.

Although the change in the excitation current setting value is shown as a straight line in FIG. 2, it actually changes in steps at predetermined intervals since the excitation current setting value is a digital value. Further, the ON/OFF reference period of current for intermittently driving the stepping motor 260 is set to be shorter than the switching cycle of the excitation current setting value changed by the A/B phase current setting signal generation circuit 440. That is, the reference period is set to a period in which the stepping motor 260 is intermittently driven within the switching cycle of the excitation current setting value. Therefore, as shown in FIG. 7, when the excitation current setting value is changed from n to n+1, the excitation current setting value "0" corresponding to the A/B phase reference signals is intermittently supplied to the D/A converter 451 during the period the excitation current setting value is maintained at n+1. This stops the supply of drive current to the stepping motor 260 and reduces current consumption.

The change in the excitation current setting value is fast when the stepping motor 260 needs to be readily operated as in a long jump. In this case, the control circuit 460 sets the ratio of the OFF period relative to the ON period of the current supplied to the stepping motor 260 to a small value. This smoothly operates the sled 240. When the sled 240 does not need to be readily operated as in a short jump or does not need to be operated at all, the control circuit 460 sets the ratio of the OFF period with respect to the ON period to a large value. This significantly reduces current consumption of the stepping motor 260. For instance, when the optical pickup unit 250 is controlled in a pause state, the operation of the sled 240 is unnecessary. As another example, during normal tracking servo, the ratio of the OFF period with respect to the ON period is set to a large value from when the optical pickup 200 moves from a predetermined reference position on the sled 240 until the movement amount is determined to be outside the movable range. This reduces current consumption. The period in which the sled 240 does not operate during tracking servo may be predicted to a certain extent from the position of the optical pickup 200 in the radial direction of the disc 100 and the rotating speed of the disc 100. Therefore, when the movement amount of the optical pickup 200 is determined to be outside the tolerable range (movable range), the control circuit 460 sets the ratio of the OFF period relative to the ON period to a small value prior to moving the sled 240 and prepares to move the sled 240.

The stepping motor control circuit 410 intermittently drives the stepping motor 260 by setting the ratio of the OFF period relative to the ON period to a smaller value during the period in which the operation of the sled 240 is necessary compared to when the operation of the sled 240 is unnecessary. That is, the control circuit 410 sets the ratio of the ON/OFF periods in correspondence with the selected one of a plurality of requested operations for the stepping motor 260 and intermittently drives the stepping motor 260 in accordance with the ratio. The control circuit 410 may set the reference period only for the OFF period to completely stop the operation of the stepping motor 260 when the operation of the sled 240 is unnecessary. The control circuit 410 may also set the reference period only for the ON period to operate the stepping motor 260 as smooth as possible when the operation of the sled 240 is necessary.

The optical disc device 10 of the present embodiment has the advantages described below.

(1) The stepping motor control circuit 410 intermittently stops supplying the stepping motor 260 with drive current for moving the optical pickup unit 250 along the radial direction of the optical disc 100. This reduces current consumption in the stepping motor 260. The drive current is supplied to the stepping motor 260 when the movement of the optical pickup unit 250 is necessary, such as during a long jump, and when the movement of the optical pickup unit 250 is unnecessary, such as during a pause or track tracing of the optical disc 100. Therefore, the current consumption is reduced not only when the stepping motor 260 is rotating (when the optical pickup unit 250 is moving) but also when the stepping motor 260 is stopped (when the optical pickup unit 250 is not moving).

(2) The stepping motor control circuit 410 includes the setting signal generation circuit 440 for generating the A/B phase current setting signals, the first switch 471 for selectively outputting the A phase current setting signal and the A phase reference signal in response to the switching signal SW, the second switch 471 for selectively outputting the B phase current setting signal and the B phase reference signal in response to the switching signal SW, and the intermittent drive control circuit 460 for generating the switching signal SW. The A/B phase reference signals respectively corresponding to the A/B phase current setting signals are easily provided to the stepping motor driver 270 intermittently by the switching signal SW.

(3) The intermittent drive control circuit 460 generates the switching signal SW in accordance with the setting value of the intermittent drive timing corresponding to the ratio of the ON period during which the stepping motor 260 is supplied with current and the OFF period in which the stepping motor 260 is not supplied with current. Therefore, the period in which current is not supplied to the stepping motor 260 is set by the ratio between the ON period and the OFF period, current consumption is reduced in accordance with the ratio.

(4) The intermittent drive control circuit 260 includes the clock generation circuit 463 for generating the clock signal CK1, and a timing generation circuit 464 for generating the switching signal SW having a pulse width corresponding to the ratio of the ON period and the OFF period based on the clock signal CK1 and the setting value of the intermittent drive timing. Therefore, the control circuit 460 easily generates the switching signal SW, which has a pulse width corresponding to the ratio of the ON period and the OFF period, by counting the clock signal CK1 and changing the level of the switching signal SW based on the count value.

It should be apparent to those skilled in the art that the present invention may be embodied in many other specific forms without departing from the spirit or scope of the invention. Particularly, it should be understood that the present invention may be embodied in the following forms.

In the preferred embodiment, the values of the register 461, 462, 473, and 474 may be changed when necessary. Further, different setting values may be stored in the first and second setting registers 473 and 474.

In the preferred embodiment, the setting value stored in each of the registers 461, 462, 473, and 474 may be a fixed value. The setting value may be provided from an external device.

In the preferred embodiment, the first and second switches 471 and 472 may be connected between the D/A converter 451 and the stepping motor driver 270. In this case, the voltage corresponding to the A/B phase reference signals, that is, the reference voltage Vref is supplied to the first and the second switches 471 and 472. The reference voltage Vref may be supplied to the stepping motor control circuit 410 from the external device or be generated using a voltage dividing circuit in the stepping motor control circuit 410.

In the above embodiment, the setting value provided to the D/A converter 451 during the OFF period through intermittent drive is not limited to "0", which corresponds to the reference voltage Vref, and may be a value that reduces the current flowing to the stepping motor 260 while maintaining the phase relationship of each excitation current setting value of the A phase and the B phase. The value generated by multiplying each excitation current setting value of the A phase and the B phase in the ON period by α (α is a positive number that is less than 1) may be set for the OFF period. In this state, each of the A phase and the B phase completely match in substantial manner between the ON period and the OFF period. Therefore, the stepping motor 260 does not operate during the OFF period and the current consumption is reduced. In addition, the value generated by multiplying the values of the A/B phase current setting signals, which are generated by the A/B phase current setting signal generation circuit 44, by α may be set for the OFF period. Alternatively, a value of the signal provided to the D/A converter 451 may be set to be the same for the ON period and the OFF period, and a signal that is α times greater may be output from the D/A converter 451 only during the OFF period.

The present examples and embodiments are to be considered as illustrative and not restrictive, and the invention is not to be limited to the details given herein, but may be modified within the scope and equivalence of the appended claims.

What is claimed is:

1. A circuit for controlling a motor, the circuit comprising:
   a motor control unit for controlling the motor for moving an optical pickup unit along a radial direction of an optical disc, wherein the optical pickup unit records data to the optical disc and/or reproduces the data recorded on the optical disc,
   wherein the motor control unit selectively supplies the motor with a first drive current, for driving the motor, and a second drive current, having a current amount reduced from the first drive current.

2. The circuit according to claim 1, wherein the motor is driven by a motor driver, and the motor control unit includes:
   a current setting signal generation circuit for generating a current setting signal corresponding to the first drive current;
   a switch circuit, connected to the current setting signal generation circuit, for providing, in accordance with a switching signal, the motor driver with either one of the current setting signal and a current reducing signal corresponding to the second drive current; and
   an intermittent drive control circuit, connected to the switch circuit, for generating the switching signal.

3. The circuit according to claim 2, wherein the current setting signal generation circuit generates the current setting signal in correspondence with a microstep drive technique based on a step number, corresponding to a rotation angle of the motor, and an excitation current setting value, indicating excitation current flowing through the motor.

4. The circuit according to claim 2, wherein the intermittent driving control circuit generates the switching signal based on a ratio of an ON period, during which the motor is supplied with a predetermined amount of current, to an OFF period, during which the motor is supplied with an amount of current reduced from the predetermined amount.

5. The circuit according to claim 4, wherein the intermittent drive control circuit includes:
   a clock generation circuit for generating a clock signal; and
   a timing generation circuit, connected to the clock generation circuit, for generating the switching signal, with a pulse width corresponding to the ratio of the ON period and the OFF period, based on the clock signal and the ratio of the ON period and the OFF period.

6. The circuit according to claim 4, further comprising a tracking servo mode for having the motor perform a plurality of requested operations, wherein the intermittent drive control circuit varies the ratio of the ON period and the OFF period in accordance with a selected one of the requested operations during the tracking servo mode.

7. The circuit according to claim 6, wherein:
   the plurality of requested operations includes an operation for having the pickup unit perform a long jump; and
   the intermittent drive control circuit sets the ratio of the OFF period relative to the ON period to a small value when the long jump is requested.

8. The circuit according to claim 6, wherein:
   the plurality of requested operations includes an operation for having the pickup unit perform a short jump; and
   the intermittent drive control circuit sets the ratio of the OFF period relative to the ON period to a large value when the short jump is requested.

9. The circuit according to claim 6, wherein:
   the plurality of requested operations includes a pause state for holding the pickup unit at a constant position; and
   the intermittent drive control circuit sets the ratio of the OFF period relative to the ON period to a large value or sets the ON period to zero when the pause state is requested.

10. The circuit according to claim 6, wherein:
    the pickup unit includes a sled, moved along the radial direction of the optical disc when the motor is driven, and an optical pickup, movably attached to the sled; and
    the intermittent drive control circuit sets the ratio of the OFF period relative to the ON period to a large value when moving the optical pickup on the sled within a movable range, and sets the ratio of the OFF period relative to the ON period to a small value when moving the sled.

11. A method for controlling a motor, the method comprising:
    generating a current setting signal for driving the motor so as to control the motor in a tracking servo mode, including a plurality of requested operations, to move an optical pickup unit along a radial direction of an optical disc, wherein the optical pickup unit is used to record data to the optical disc and/or reproduce the data recorded on the optical disc, and the motor is driven by a motor driver;
    setting a ratio of an ON period, during which the motor is supplied with a predetermined amount of current, to an OFF period, during which the motor is supplied with an amount of current reduced from the predetermined amount;

selectively providing the motor driver with the current setting signal and a current reducing signal for reducing current for driving the motor based on the set ratio; and varying the ratio of the ON period and the OFF period in accordance with a selected one of the requested operations during the tracking servo mode.

12. A method for controlling a motor, the method comprising:

generating a current setting signal for driving the motor so as to control the motor for moving an optical pickup unit along a radial direction of an optical disc, wherein the optical pickup unit is used to record data to the optical disc and/or reproduce the data recorded on the optical disc, and the motor is driven by a motor driver;

setting a ratio of an ON period, during which the motor is supplied with a predetermined amount of current, to an OFF period, during which the motor is supplied with an amount of current reduced from the predetermined amount;

selectively providing the motor driver with the current setting signal and a current reducing signal for reducing current for driving the motor based on the set ratio.

* * * * *